United States Patent
Pani et al.

(10) Patent No.: US 9,894,122 B2
(45) Date of Patent: Feb. 13, 2018

(54) TRACEROUTE IN VIRTUAL EXTENISBLE LOCAL AREA NETWORKS

(71) Applicant: Cisco Technology, Inc., San Jose, CA (US)

(72) Inventors: Ayaskant Pani, Fremont, CA (US); Tianpei Zhang, Cupertino, CA (US); Sanjay Thyamagundalu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 225 days.

(21) Appl. No.: 14/515,590

(22) Filed: Oct. 16, 2014

(65) Prior Publication Data

US 2016/0112481 A1 Apr. 21, 2016

(51) Int. Cl.
*H04L 29/06* (2006.01)
*H04L 12/761* (2013.01)
*H04L 12/753* (2013.01)
*H04L 12/46* (2006.01)

(52) U.S. Cl.
CPC ...... *H04L 65/4076* (2013.01); *H04L 12/4633* (2013.01); *H04L 12/4645* (2013.01); *H04L 45/16* (2013.01); *H04L 45/48* (2013.01); *H04L 69/22* (2013.01); *H04L 2012/4629* (2013.01); *Y02B 60/43* (2013.01)

(58) Field of Classification Search
CPC ...... H04L 65/4076; H04L 69/22; H04L 12/56
See application file for complete search history.

(56) References Cited

U.S. PATENT DOCUMENTS

| | | | |
|---|---|---|---|
| 8,339,973 B1 | 12/2012 | Pichumani et al. | |
| 8,750,288 B2 | 6/2014 | Nakil et al. | |
| 2009/0122697 A1* | 5/2009 | Madhyasha | H04L 41/12 370/229 |
| 2011/0317696 A1* | 12/2011 | Aldrin | H04L 12/1881 370/390 |
| 2012/0127875 A1* | 5/2012 | Zhao | H04L 12/4625 370/252 |
| 2013/0170490 A1 | 7/2013 | Kreeger et al. | |

(Continued)

OTHER PUBLICATIONS

International Search Report and Written Opinion in counterpart International Application No. PCT/US2015/055643, dated Feb. 3, 2016, 12 pages.

(Continued)

*Primary Examiner* — Edan Orgad
*Assistant Examiner* — Nourali Mansoury
(74) *Attorney, Agent, or Firm* — Edell, Shapiro & Finnan, LLC

(57) ABSTRACT

An inner packet configured with a multicast address and configured to perform a traceroute operation through a network is encapsulated to form an encapsulated packet. The encapsulated packet is sent into a network, the encapsulated packet being forwarded along a multicast tree of the network for the multicast address. A plurality of responses are received from a plurality of network nodes comprising the multicast tree, wherein each response comprises an indication of a node of the plurality of nodes that sends the response and an indication of a node from which the node sending the response received the encapsulated packet.

21 Claims, 5 Drawing Sheets

(56) References Cited

U.S. PATENT DOCUMENTS

| | | | | |
|---|---|---|---|---|
| 2013/0329584 A1* | 12/2013 | Ghose | .................. | H04L 45/586 |
| | | | | 370/252 |
| 2014/0068054 A1 | 3/2014 | Pollnow et al. | | |
| 2014/0098675 A1* | 4/2014 | Frost | .................... | H04L 69/166 |
| | | | | 370/241.1 |
| 2014/0229612 A1 | 8/2014 | Chandrashekar et al. | | |
| 2014/0269432 A1* | 9/2014 | Goyal | .................. | H04L 49/354 |
| | | | | 370/255 |
| 2014/0348022 A1* | 11/2014 | Jain | ...................... | H04L 12/185 |
| | | | | 370/254 |
| 2015/0244617 A1* | 8/2015 | Nakil | ..................... | H04L 43/04 |
| | | | | 709/224 |
| 2016/0088578 A1* | 3/2016 | Das | .................... | H04W 56/001 |
| | | | | 370/350 |

OTHER PUBLICATIONS

Asaeda et al., "Mtrace Version 2: Traceroute Facility for IP Multicast, draft-ietf-mboned-mtrace-v2-10", MBONED Network Group, Internet-Draft, Jul. 9, 2013, 33 pages.

* cited by examiner

TRACEROUTE IN VIRTUAL EXTENISBLE LOCAL AREA NETWORKS

TECHNICAL FIELD

The present disclosure relates to traceroute procedures, and in particular, traceroute procedures using encapsulation protocols such as those used in virtual extensible local area networks.

BACKGROUND

Traceroute is a diagnostic tool for displaying the route (path) and measuring transit delays of packets across an Internet Protocol (IP) network. The history of the route is recorded as the round-trip times of the packets received from each successive host (remote node) in the route (path). The sum of the mean times in each hop indicates the total time spent to establish the connection. Traceroute proceeds unless the sent packets are lost more than twice, then the connection is lost and the route cannot be evaluated.

Virtual Extensible Local Area Network (VXLAN) is a network virtualization technology that attempts to ameliorate the scalability problems associated with large cloud computing deployments. VXLAN uses a VLAN-like encapsulation technique to encapsulate MAC-based Open System Interconnection (OSI) layer 2 Ethernet frames. VXLAN is an evolution of efforts to standardize on an overlay encapsulation protocol. It increases scalability up to 16 million logical networks and allows for layer 2 adjacency across internet protocol (IP) networks. Multicast is used to contain broadcast traffic, multicast traffic and unicast traffic with an unknown destination.

DESCRIPTION OF EXAMPLE EMBODIMENTS

Overview

According to an example embodiment, an inner packet configured with a multicast address and configured to perform a traceroute operation through a network is encapsulated to form an encapsulated packet. The encapsulated packet is sent into the network, the encapsulated packet being forwarded along a multicast tree of the network for the multicast address. Responses are received from a plurality of network nodes comprising the multicast tree, wherein each response comprises an indication of a node of the plurality of nodes that sends the response and an indication of a node from which the node sending the response received the encapsulated packet.

According to a second example embodiment, an encapsulated packet is received at a network node along a path from an ingress node to at least one egress node of a network, an inner packet being encapsulated within the encapsulated packet. It is determined from the inner packet that the encapsulated packet is configured to perform a traceroute procedure. At least one of a copy of the encapsulated packet or the inner packet is sent towards a destination indicated in the encapsulated packet along a multicast tree. A response is sent to the ingress node comprising an indication of the network node and an indication of a sending network node from which the network node received the encapsulated packet.

Example Embodiments

Figure 1:
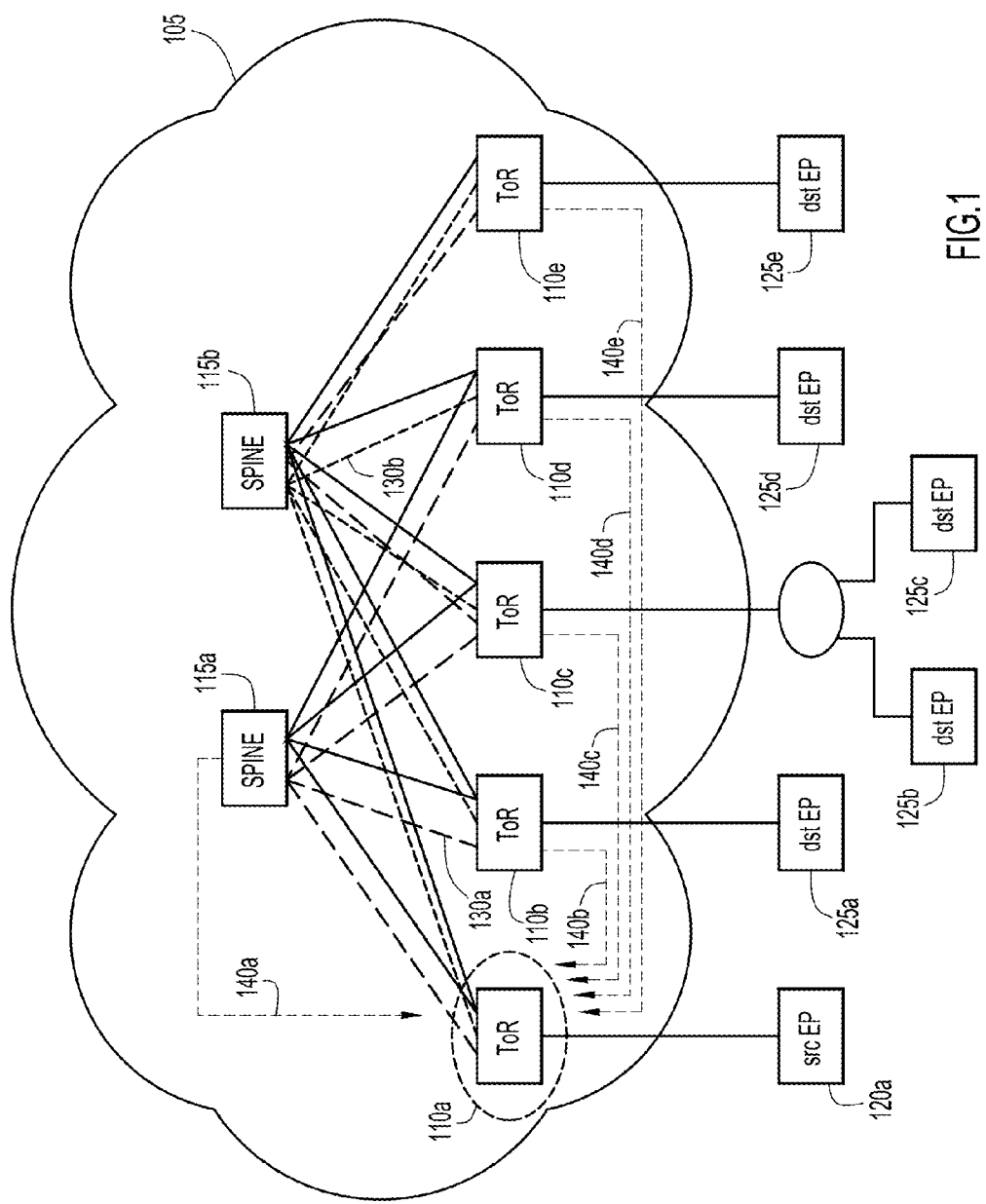
FIG. 1 shows a network environment, including a VXLAN, configured to provide a traceroute procedure, according to an example embodiment.

Depicted in FIG. 1 is a network 100 configured to provide a traceroute function in a virtual extensible local area network (VXLAN) 105, though the techniques taught herein may also be applied to other encapsulation technologies, and infrastructure layer encapsulation in particular, such as Transparent Interconnection of Lots of Links (TRILL) computing. Specifically, network 100 is configured to provide traceroute functionality for multicast messages and/or packets. Accordingly, the techniques described herein will allow traceroute functionality which traces a packet's path through load balanced multicast forwarding trees (i.e., the forward tag trees (FTAGs)). Furthermore, the techniques described herein may provide substantial benefits over traditional traceroute techniques, as the techniques described herein may utilize significantly fewer messages to achieve end-to-end path mapping.

The traceroute techniques described herein allow an initiating top-of-rack (ToR) switch to determine the multicast trees which are traversed by a multicast message encapsulated by the initiating ToR. For example, a user may wish to specifically determine the end-to-end paths through a VXLAN from a source node to multicast or broadcast destinations. The traceroute procedure, as shall be described in reference to FIG. 1, shall determine the paths between the ToR which serves as the entry into the VXLAN (i.e., ingress node), and the ToRs which serve as the exits from the VXLAN (i.e., egress nodes). Specifically, the initiating ToR will send a traceroute enabled packet over the load balanced FTAGs for a particular multicast address. When each of the nodes in VXLAN 105 receives a packet configured for a traceroute procedure, each of the nodes is configured to send a response message to the initiating node while continuing to forward the traceroute configured packet to the next node or nodes in the FTAG. The responses may include, for example, an indication of a relative position of the responding node within VXLAN 105. Accordingly, the responses, along with other information that may be included in the responses or known by the initiating ToR, can be used to construct the multicast tree traversed by the traceroute packet, and provide information about the status of the multicast tree, such as its current congestion level. Furthermore, because the traceroute enabled packet is forwarded on by the responding node towards the multicast destination, the initiating ToR may only need to send a single traceroute enabled packet along each FTAG.

According to the specific example of FIG. 1, VXLAN 105 is comprised of ToRs 110*a-e* and spine switches 115*a* and 115*b*. Outside of VXLAN 105 are endpoint nodes 120*a* and 125*a-e*. These endpoint nodes 125*a-e* may represent tenant nodes, while ToRs 110*a-e* and spine switches 115*a* and 115*b* are VXLAN service provider nodes. Tenants may not be able to initiate a traceroute procedure, but may nevertheless request their service provider to provide traceroute functionality through VXLAN 105. If, for example, a tenant requests that a traceroute procedure be initiated for traffic travelling between tenant source endpoint 120*a* to the multicast address for destination tenant endpoints 125*a-e*, a traceroute procedure may be initiated by the service provided at ToR 110*a*.

Accordingly, an inner packet, such as a User Datagram Protocol (UDP) packet will be generated with a multicast address for endpoints 125*a-e*, which ToR 110*a* will encapsulate for transmission through VXLAN 105. According to other examples, the entire VXLAN encapsulated packet, including an inner packet, will be generated for transmission through VXLAN 105. The VXLAN encapsulated packet will then traverse VXLAN 105, being sent through VXLAN 105 via one of two load-balanced multicast trees, or FTAGs. A first FTAG 130*a* (illustrated by the long dashed line) is made up of the paths that utilize spine switch 115*a*. Specifically, first FTAG 130*a* includes the following paths:
  Tor 110*a* to Spine 115*a* to ToR 110*b*;
  Tor 110*a* to Spine 115*a* to ToR 110*c*;
  Tor 110*a* to Spine 115*a* to ToR 110*d*;
  Tor 110*a* to Spine 115*a* to ToR 110*e*;
A second FTAG 130*b* (illustrated by the short dashed line) is made up of the paths that utilize spine switch 115*b*. Specifically, second FTAG 130*b* includes the following paths:
  Tor 110*a* to Spine 115*b* to ToR 110*b*;
  Tor 110*a* to Spine 115*b* to ToR 110*c*;
  Tor 110*a* to Spine 115*b* to ToR 110*d*; and
  Tor 110*a* to Spine 115*b* to ToR 110*e*.

Depending on, for example, the port over which the traceroute enabled multicast packet is sent, the packet may traverse either of the first FTAG 130*a* or the second FTAG 130*b*.

While in some example embodiments ToR 110*a* will be aware of the topography of VXLAN 105, and may be aware of the structure of first FTAG 130*a* and second FTAG 130*b*, dynamic issues, such as data plane programming and quality of service (QoS) buffering, may affect the path packets traverse through VXLAN 105. In order to allow ToR 110*a* to accurately learn FTAGs 130*a* and 130*b* (including any dynamic changes to the paths), and to perform diagnostic tests along the multicast trees, ToRs 110*a-e* and spine switches 115*a* and 115*b* are configured to perform traceroute functionality for multicast trees. Specifically, each of ToRs 110*a-e* and spines 115*a* and 115*b* is configured to send a response message to the originating ToR, in this case ToR 110*a*, with information identifying both the node that received the traceroute packet, and information identifying the location of the node within VXLAN 105, such as the identity of the node from which the traceroute enabled packet was received. ToR 110*a* can take steps to ensure that the traceroute configured packet is sent over each of first FTAG 130 and second FTAG 130*b*. ToR 110*a* can then use the information received in the response messages to determine path taken by the traceroute enabled packet of first FTAG 130 and second FTAG 130*b*.

In order to initiate a traceroute procedure in VXLAN 105, a packet is formed at ToR 110*a*, in this case a UDP packet, using the destination IP multicast group address, i.e. the multicast address for destination endpoints 125*a-e*. For example, the destination address for the UDP packet may take the form of an Open System Interconnection (OSI) layer-2 or layer-3 multicast address. In other words, the UDP packet establishes the routes to be traced by the traceroute packet by determining the endpoint for the trace. Furthermore, the UDP packet may be configured to identify itself as a traceroute packet. For example, the packet may be configured as a traceroute packet by setting one or more of the following fields with a predetermined value: the inner packet's OSI layer 3 packet's protocol type, the UDP destination port, and/or in the inner packet's internet protocol time-to-live (TTL). If the TTL for the UDP packet is set to 1, it may serve to designate the packet as a packet configured to provide a traceroute function in a VXLAN. While TTL for the inner packet may be set to 1, the TTL for the outer encapsulation may be set to a value large enough to allow the packet to traverse VXLAN 105 and egress VXLAN 105 (i.e., greater than or equal to the number of nodes between ingress ToR 110*a* and any one of egress ToRs 110*b-e*).

Furthermore, combining the inner TTL value with one or more of a UDP protocol type and/or a predetermined UDP destination port may also serve to designate the packet as configured to perform a traceroute function. Additional values can also be used to cut down on detecting "false positives" of traceroute packets. For example, the first six characters of the UDP source port field may also be set to a value that identifies the packet as being configured to perform a VXLAN traceroute function. The inner packet may also include information such as a timestamp of when the packet is to be sent and identification information, such as the address for the initial VXLAN node, in this case ToR 110*a*.

Once created and encapsulated, the traceroute packet is to be sent over VXLAN 105 via the hardware forwarding plane of ToR 110*a* towards the next switch in the VXLAN, in this case, spine 115*a*. Upon receipt of the encapsulated packet, spine 115*a* examines the content of the encapsulation or VXLAN header, and also examines content of the encapsulated UDP packet. Based on the examined content, spine 115*a* determines that the packet is configured for a traceroute procedure in a VXLAN. This determination may be based on predetermined values in the fields discussed above, such as the TTL of the UDP packet, the UDP destination port, the inner packet protocol type, or a portion of the UDP source port field. In response to this determination, spine 115*a* will send a response message 140*a* to ToR 110*a*.

Response message 140*a* will include information that will identify the relative position of spine 115*a* within VXLAN 105. This information may include the IP address or identifier of spine 115*a*, the TTL of the encapsulation of the packet, the ingress port from which the packet was received, the egress port on which packet was captured and/or a time stamp of receipt of the packet. Response message 140*a* may also send some portion of the inner packet data, such as a packet identifier to allow originating ToR 110*a* to correlate responses to probe packets (i.e., tell ToR 110*a* which packet caused spine 115*a* to send response message 140*a*). Response message 140*a* may also include information such as an internal application specific integrated circuit (ASIC) number and/or an ASIC port number to capture very detailed packet path information, including information as the packet traverses the internal switching plane of the intermediate nodes. Accordingly, a non-exhaustive list of what may be included in response message 140*a* is as follows:
  An identification of the encapsulated packet
  FTAG identifier
  Outer TTL
  Current VXLAN node ID
  Incoming port or interface
  Neighboring switch node/interface for the incoming interface
  Initiating ToR Identifier
  Other useful info, such as timestamp etc.

In order to facilitate the sending of response message 140a, spine 115a may be embodied with logic, in the form of hardware or software, configured to determine that the packet received form ToR 110a was configured to carry out a traceroute procedure in VXLAN 105, as well as the logic necessary to send response message 140a back to ToR 110a. According to some example embodiments, spine 115a will leverage the access control list (ACL) logging rules that VXLAN nodes are configured to carry out. For example, spine 115a may be pre-programmed with ACL logging rules which send copies of packets matching certain criteria to the central processing unit (CPU) of spine 115a. The criteria for ACL logging may be based on the fields which are used to identify the packet as being configured to perform a traceroute function within VXLAN 105, such as the inner packet's protocol type, its UDP destination port and/or its TTL value. Once received by the CPU, the CPU will send response message 140a back to ToR 110a.

Spine 115a will also forward or send the traceroute configured packet to the remainder of the endpoints in the multicast address of the inner packet. Accordingly, spine 115a will send the packet to each of ToRs 110b-e, which serve as egress nodes for VXLAN 105. Each of ToRs 110b-e will send a response message 140b-e, respectively, back to ToR 110a in a procedure analogous to that followed by spine 115a when sending response message 140a. Upon receiving response messages 140a-e, ToR 110a may now have information defining the end-to-end path that the traceroute configured packet traversed from ToR 110a to each of VXLAN egress nodes 110b-e. By using, for example, the TTL information contained in each packet in conjunction with the ingress port or the FTAG identifier information, ToR 110a may determine which of spines 115a-b and ToRs 110b-e were traversed, thereby distinctly determining the path traversed by the traceroute enabled packet through the first FTAG 130a. If more than one node responds with a TTL with the same value, a wiring diagram may be used to determine the exact path. According to other example embodiments in which ToR 110a is aware of the structure of FTAG 130a, the exact path traversed by the traceroute enabled packet may be determined based on a returned FTAG identifier and a TTL valued at each of the intermediate notes along the traversed path.

If a wiring diagram is not available, additional information may be used to determine the path through VXLAN 105. For example, the information necessary to determine FTAG 130a may be included in response messages 140a-e. If the response messages 140a-e include the ingress port information at each intermediate VXLAN node (i.e., spine 115a and ToRs 110b-e), this information may also be used to determine FTAG 130a. According to other example embodiments, intermediate system to intermediate system (ISIS) topological graph information may be used to form the structure of the FTAG tree instances. This information, in conjunction with the other information included in the response messages 140a-e, may be used to specifically determine the first FTAG 130a. Similarly, information contained in a link layer discovery protocol (LLDP) neighbor database may be used in conjunction with the information returned via response messages 140a-e to determine first FTAG 130a.

The techniques described herein can also exploit the fact that an FTAG identifier is part of the Group IP (outer) (GIPo) address of the packet. In the intermediate nodes 115a and 110b-e, when the response message is formed, the FTAG identifier over which the traceroute configured packet was received can be included in the response message. This information can then be used in the originating node, in this case ToR 110a, to create the load balanced multicast tree or FTAG that the particular traceroute configured packet was following. Specifically, each node is aware of the FTAG tree topology, and given the FTAG identifier and the intermediate nodes the packet traverses, ToR 110a can easily determine the sub-tree space of the particular FTAG.

Finally, exit ToRs can be uniquely identified as they will strip the encapsulation from the inner packet. Because the inner packet will have a TTL of 1, the egress ToR will also send an internet control message protocol (ICMP) unreachable message back to ingress ToR 110a.

In order to determine second FTAG 130b, the process described above for first FTAG 130a will be repeated for second FTAG 130b. ToR 110a will ensure that the process finds second FTAG 130b by generating a second traceroute configured packet, but altering information in the headers of the inner packet, such as the source UDP port. The traceroute procedures for first FTAG 130a and second FTAG 130b may take place simultaneously or consecutively.

Figure 2:
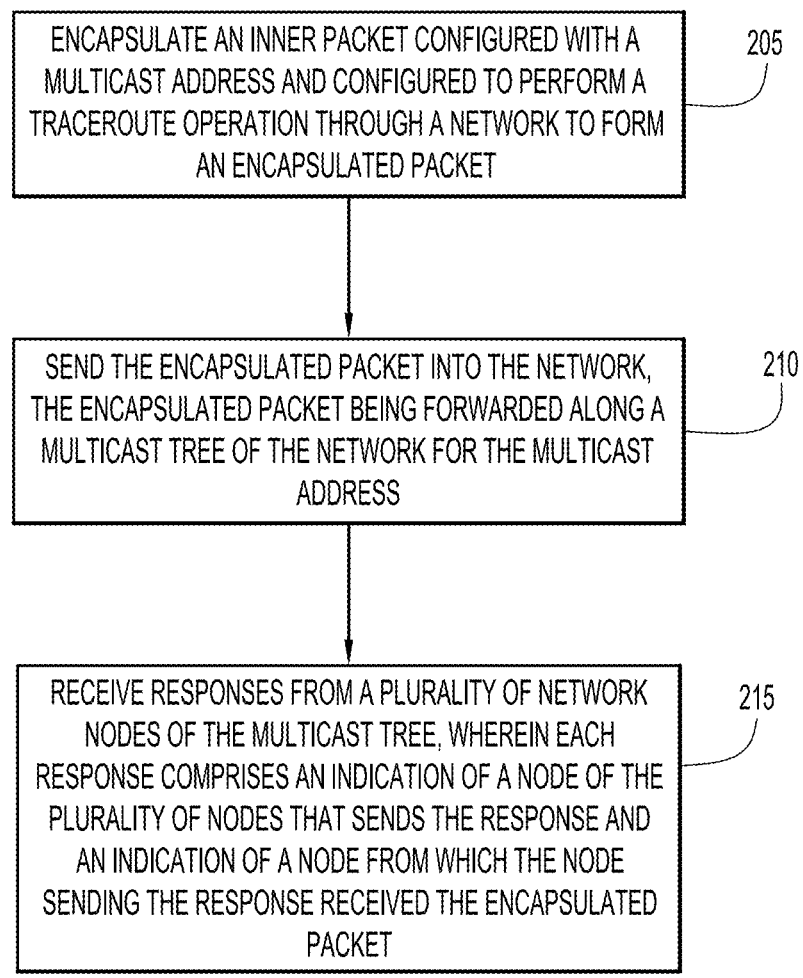
FIG. 2 is a flowchart illustrating a traceroute procedure, particularly the process performed by an initiating VXLAN node, according to an example embodiment.

With reference now made to FIG. 2, depicted therein is flowchart 200 illustrating an example process for carrying out a traceroute procedure in a network environment utilizing encapsulation technologies, and infrastructure layer encapsulation in particular. The process of flowchart 200 is from the perspective of an initiating or ingress network node, such as ToR 110a of FIG. 1. The process begins in 205 where an inner packet configured with a multicast address and configured to perform a traceroute operation through a network is encapsulated to form an encapsulated packet. Encapsulating the traffic may comprise encapsulating a packet such as those described above in reference to FIG. 1, or those which shall be described below with reference to FIG. 4. In 210, the encapsulated packet is sent into a network, the encapsulated packet being forwarded along a multicast tree of the network for the multicast address. As described above, the sending of the packet into the network, a VXLAN for example, may comprise injecting the packet into the VXLAN through an initiating VXLAN node, such as ToR 110a of FIG. 1.

In 215, a plurality of responses are received from a plurality of network nodes comprising the multicast tree, wherein each response comprises an indication of a node of the plurality of nodes that sends the response and an indication of a node from which the node sending the response received the encapsulated packet. As illustrated in FIG. 1, the plurality of network nodes may be VXLAN nodes, such as spines 115a and 115b and ToRs 110b-e. The responses include information which indicates a relative order of receipt of the encapsulated packet relative to other nodes of the plurality of nodes. The responses may then be used to determine the possible paths through the network, as described above with reference to FIG. 1.

Figure 3:
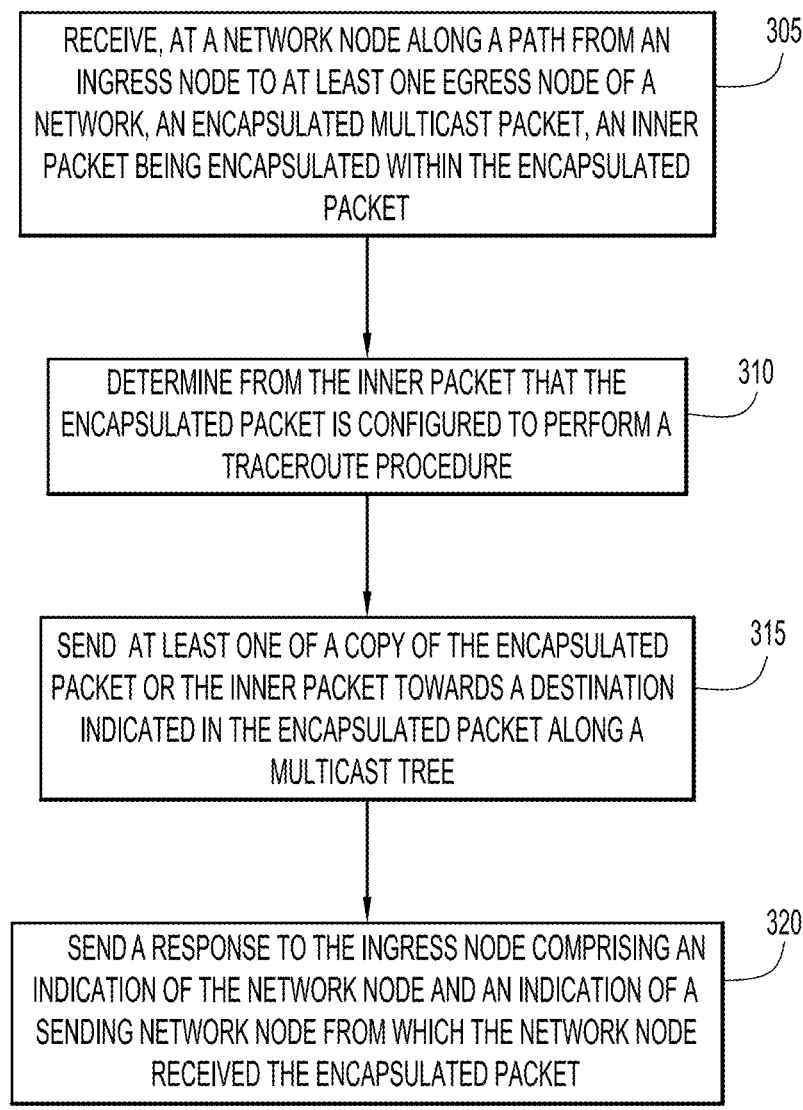
FIG. 3 is a flowchart illustrating a traceroute procedure, particularly the process performed by an intermediate or egress VXLAN node, according to an example embodiment.

With reference now made to FIG. 3, depicted therein is flowchart 300 illustrating an example process for performing a traceroute procedure in a network environment utilizing encapsulation technologies, and infrastructure layer encapsulation in particular, from the perspective of an intermediate node (such as spines 115a and 115b of FIG. 1) or an egress node (such as ToRs 110b-e of FIG. 1). The process begins in 305 wherein an encapsulated packet is received at a network node along a path from an ingress node to at least one egress node of a network, an inner packet being encapsulated within the encapsulated packet. In 310, it is determined from the inner packet that the encapsulated packet is configured to perform a traceroute procedure. The determination may be made according to the description provided above with reference to FIG. 1, or below with reference to FIG. 4.

In 315, at least one of a copy of the encapsulated packet or the inner packet is sent towards a destination indicated in the encapsulated packet along a multicast tree. For example, if the receiving node is an intermediate VXLAN node along a path through the VXLAN, the encapsulated packet will be forwarded to the next VXLAN node along its path. If the VXLAN node is the egress node, the unencapsulated traffic may be sent along the path to its ultimate destination, or the egress VXLAN node may send an internet control message protocol (ICMP) unreachable message back to the ingress VXLAN packet if the unencapsulated traffic has a TTL of 1. In 320, a response is sent to the ingress node comprising an indication of the network node and an indication of a sending network node from which the network node received the encapsulated packet. While 320 is illustrated after 315, these aspects of flowchart 300 may take place simultaneously or in an order other than that illustrated in FIG. 3.

Figure 4:
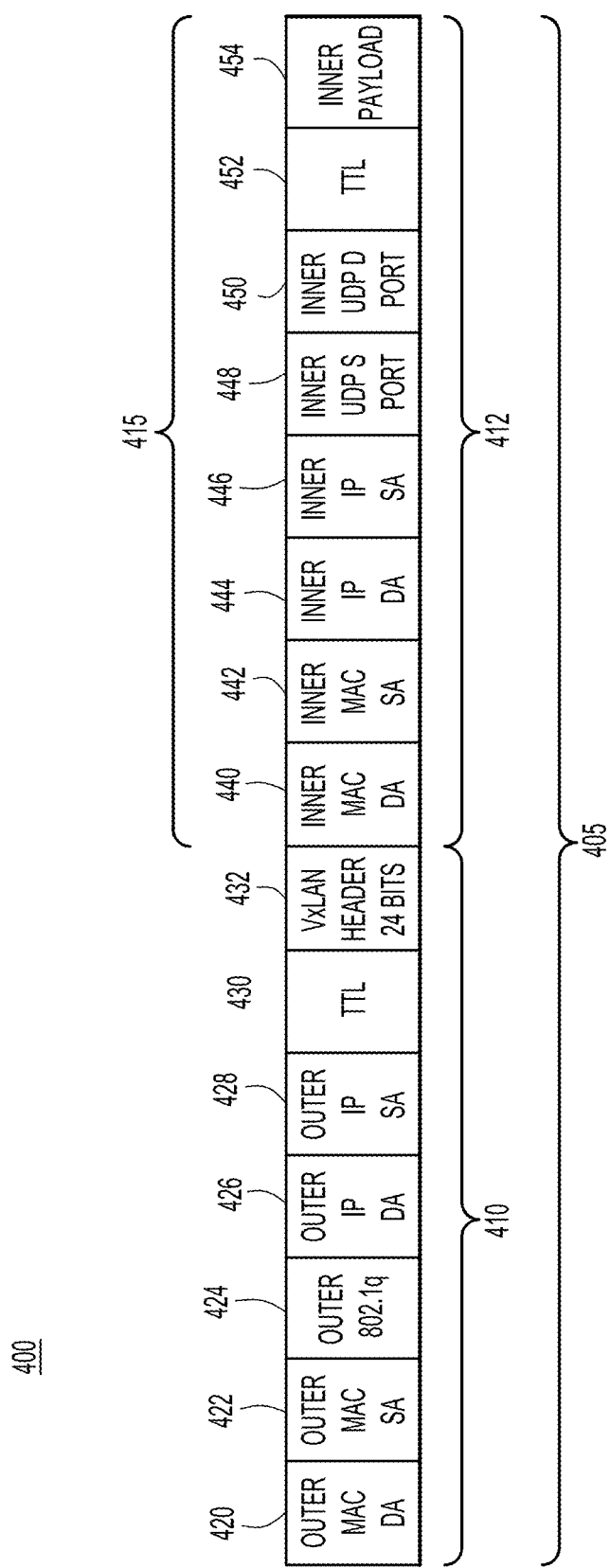
FIG. 4 shows a VXLAN encapsulated packet configured to perform a traceroute procedure, according to an example embodiment.

With reference now made to FIG. 4, depicted therein is an encapsulated multicast packet configured to perform a traceroute procedure in a network environment utilizing encapsulation technologies, and infrastructure layer encapsulation in particular, such as a VXLAN. Packet 400 comprises a VXLAN packet 405 which includes a header portion 410 and a payload portion 412. Encapsulated within the payload portion 412 of the VXLAN packet 405 is a UDP packet 415. The VXLAN packet comprises a media access control (MAC) destination address 420, a MAC source address, an IEEE 802.1Q header 424, an IP destination address 426, and IP source address 428, a VXLAN TTL 430, and a VXLAN header 432. The encapsulated UDP packet 415 includes a destination MAC address 440, a source MAC address 442, an IP source address 444, an IP destination address 446, a UDP source port 448, a UDP destination port 450, a UDP TTL 452, and a UDP payload 454. The fields may be used to indicate to VXLAN nodes that the packet is configured to perform a traceroute operation in a VXLAN, as described above with reference to FIGS. 1-3. For example, the UDP TTL 452 can serve as an indication that the packet is configured to perform a traceroute operation, particularly if the UDP TTL 452 has a value of 1. Furthermore, other values, or the values combined with the UDP TTL 452, value may serve to designate the packet 400 as being configured to perform a traceroute procedure. For example, a predetermined UDP destination port 450 may also serve to designate the packet as being configured to perform a traceroute function. As a further example, the first six characters of the UDP source port 448, when used in conjunction with a UDP TTL 452 value of 1 may serve to designate the packet 400 as being configured to perform a traceroute procedure.

In order to send packet 405 over different multicast trees, values in the UDP packet maybe altered. For example, the value of the UDP port 450 may be changed to force the packet to enter the VXLAN over a different port, and therefore, traverse the network by a different multicast tree. As some VXLAN systems use a hashing of inner port header values to determine which multicast tree is to receive a VXLAN packet, any of the values contributing to the hashing may also be altered.

Figure 5:
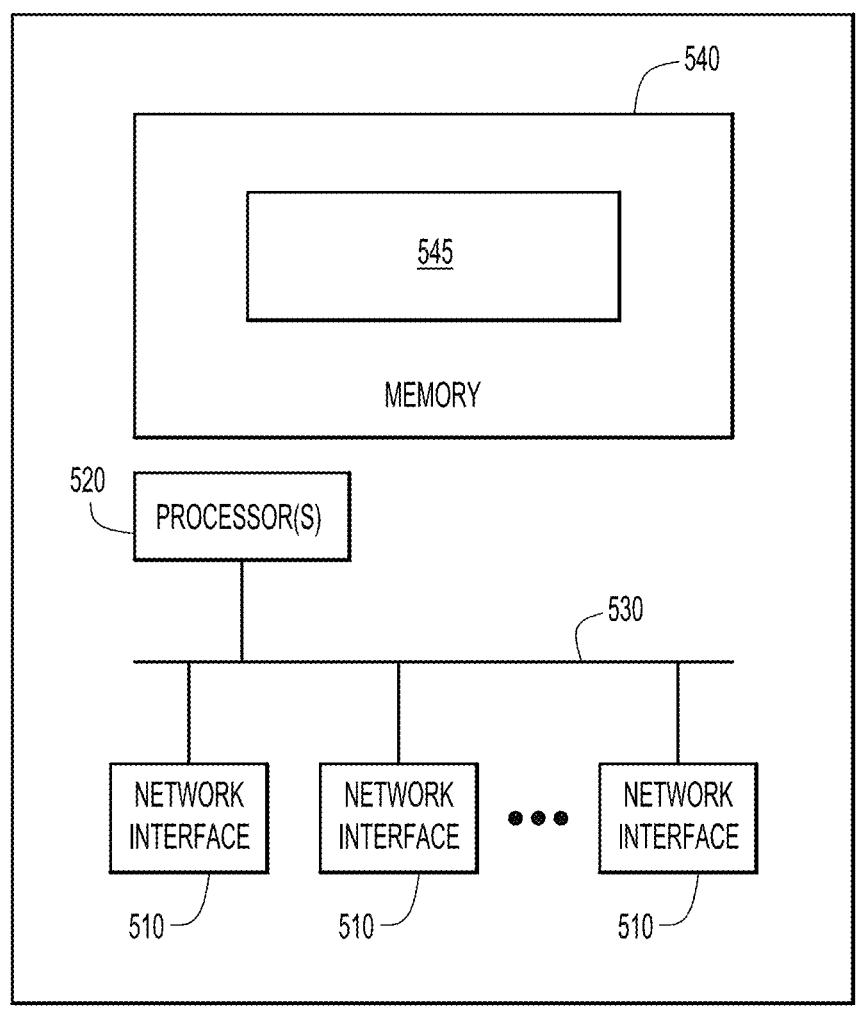
FIG. 5 shows a device, such as a VXLAN node, configured to perform a traceroute procedure, according to an example embodiment.

With reference now made to FIG. 5, an example block diagram is shown of a network node, such as a ToR or spine of a VXLAN, like those illustrated in FIG. 1, configured to perform the techniques described herein. Network node 505 comprises network interfaces (ports) 510 which may be used to connect to a network. One or more processors 520 are provided to coordinate and control network node 505. The processor 520 is, for example, one or more microprocessors or microcontrollers, and it communicates with the network interface 510 via bus 530. Memory 540 comprises software instructions 545 which may be executed by the processor 520. For example, software instructions 545 for network node 505 include instructions for performing a traceroute procedure, like those described in reference to FIGS. 1-3. In other words, memory 540 includes instructions for network node 505 to carry out the operations described above in connection with FIGS. 1-3. When network node 505 serves as an ingress node, instructions 545 may include instructions to carry out the traceroute procedure as described in reference to ToR 110a of FIG. 1, and process 200 of FIG. 2. When network node 505 serves as an intermediate or egress network node, instructions 545 may include instructions to perform the traceroute procedures as described with reference to spines 115a and 115b and ToRs 110b-e of FIG. 1, and flowchart 300 of FIG. 3.

Memory 540 may comprise read only memory (ROM), random access memory (RAM), magnetic disk storage media devices, optical storage media devices, flash memory devices, electrical, optical or other physical/tangible (e.g. non-transitory) memory storage devices. Thus, in general, the memory 540 may comprise one or more tangible (non-transitory) computer readable storage media (e.g., a memory device) encoded with software comprising computer executable instructions. When the software 545 is executed (by the processor 520), the processor is operable to perform the operations described herein in connection with FIGS. 1-3.

In summary, a method is provided comprising: encapsulating an inner packet configured with a multicast address and configured to perform a traceroute operation through a network to form an encapsulated packet; sending the encapsulated packet into the network, the encapsulated packet being forwarded along a multicast tree of the network for the multicast address; and receiving responses from a plurality of network nodes comprising the multicast tree, wherein each response comprises an indication of a node of the plurality of nodes that sends the response and an indication of a node from which the node sending the response received the encapsulated packet In another form, a method is provided comprising: receiving, at a network node along a path from an ingress node to at least one egress node of a network, an encapsulated multicast packet, an inner packet being encapsulated within the encapsulated packet; determining from the inner packet that the encapsulated packet is configured to perform a traceroute procedure; sending at least one of a copy of the encapsulated packet or the inner packet towards a destination indicated in the encapsulated packet along a multicast tree; and sending a response to the ingress node comprising an indication of the network node and an indication of a sending network node from which the network node received the encapsulated packet In still another form, an apparatus is provided comprising: a network interface unit to enable communication over a network; and a processor coupled to the network interface unit to: encapsulate an inner packet configured with a multicast address and configured to perform a traceroute operation through a network to form an encapsulated packet; send the encapsulated packet into the network, the encapsulated packet being forwarded along a multicast tree of the network for the multicast address; and receive responses from a plurality of network nodes comprising the multicast tree, wherein each response comprises an indication of a node of the plurality of nodes that sends the response and an indication of a node from which the node sending the response received the encapsulated packet.

The above description is intended by way of example only. Various modifications and structural changes may be made therein without departing from the scope of the concepts described herein and within the scope and range of equivalents of the claims.

What is claimed is:

1. A method comprising:
   encapsulating an inner packet, configured with a multicast destination address and configured to perform a traceroute operation through a network, to form an encapsulated packet;
   sending the encapsulated packet into the network, the encapsulated packet being forwarded along a multicast tree of the network for the multicast destination address from a source device to a plurality of multicast destination devices; and
   receiving a separate response message from each of a plurality of network nodes comprising the multicast tree between the source device and each of the plurality of destination devices, wherein each response message is sent to the source device from respective network nodes of the plurality of network nodes in response to receipt of the encapsulated packet at the respective network nodes as the encapsulated packet traverses the multicast tree in a direction from the source device to the plurality of multicast destination devices, and each response message comprises an indication of a network node of the plurality of network nodes that sends the response message and an indication of a network node from which the network node sending the response message received the encapsulated packet.

2. The method of claim 1, wherein encapsulating the inner packet comprising encapsulating the inner packet in accordance with virtual extensible local area network (VXLAN) encapsulation; and
   wherein sending the encapsulated packet into the network comprises sending the encapsulated packet into a VXLAN network.

3. The method of claim 1, further comprising:
   modifying header information of the inner packet to form a modified inner packet;
   encapsulating the modified inner packet to form a modified encapsulated packet;
   sending the modified encapsulated packet into the network, wherein the modified encapsulated packet is forwarded along a second multicast tree of the network for the multicast destination address in response to the modifying; and
   receiving response messages from a plurality of network nodes comprising the second multicast tree.

4. The method of claim 3, wherein modifying the header information comprises modifying a User Datagram Protocol (UDP) source port value.

5. The method of claim 3 wherein sending the modified encapsulated packet into the network comprises sending the modified encapsulated packet into the network from a different port than a port from which the encapsulated packet was sent into the network.

6. The method of claim 3, further comprising:
   determining a first end-to-end path traversed by the encapsulated packet from the response messages received from the plurality of network nodes comprising the multicast tree; and
   determining a second end-to-end path traversed by the modified encapsulated packet from the response messages received from the plurality of network nodes comprising the second multicast tree.

7. The method of claim 1, wherein receiving the response messages comprises receiving at least one of an internet protocol (IP) address for the network node of the plurality of network nodes that sends the response message, a time to live (TTL) value for the encapsulated packet, an ingress port over which the encapsulated packet was received, an egress port over which the encapsulated packet was sent to the network node of the plurality of network nodes that sends the response message, an application specific integrated circuit (ASIC) number for the network node of the plurality of network nodes that sends the response message, or an ASIC port number for the network node of the plurality of network nodes that sends the response message.

8. The method of claim 1, further comprising utilizing the response messages and at least one of intermediate system to intermediate system (ISIS) topological graph information or a link layer discover protocol (LLDP) neighbor database to determine an end-to-end path traversed by the encapsulated packet.

9. The method of claim 1, further comprising receiving an internet control message protocol (ICMP) unreachable message from an egress node of the network in response to a time to live (TTL) value of the inner packet.

10. A method comprising:
    receiving, at a network node along a path from an ingress node to at least one egress node of a network, an encapsulated multicast packet sent from a source device, an inner packet being encapsulated within the encapsulated multicast packet, wherein the multicast packet is addressed to a plurality of multicast destination devices along a multicast tree with a multicast destination address, wherein the inner packet is configured to cause each network node along the multicast tree that receives the encapsulated multicast packet to send a separate response packet to the source device, and wherein the encapsulated multicast packet is received at the network node as the encapsulated multicast packet traverses the network in a direction towards the plurality of multicast destination devices;
    determining from the inner packet that the encapsulated multicast packet is configured to perform a traceroute procedure;
    sending at least one of a copy of the encapsulated multicast packet or the inner packet towards at least one of the multicast destination devices along the multicast tree; and
    sending a response to the ingress node comprising an indication of the network node and an indication of a sending network node from which the network node that received the encapsulated multi cast packet.

11. The method of claim 10, wherein receiving the encapsulated multicast packet comprises receiving a virtual extensible local area network (VXLAN) packet.

12. The method of claim 10, wherein determining that the encapsulated multicast packet is configured to perform the traceroute procedure comprises examining a time-to-live (TTL) of the inner packet.

13. The method of claim 10, wherein determining that the encapsulated multicast packet is configured to perform the traceroute procedure comprises examining a destination port value of the inner packet.

14. The method of claim 10, wherein sending the response comprises sending a copy of the encapsulated multicast packet to a central processing unit (CPU) of the network node.

15. The method of claim 14, wherein sending the response further comprises the CPU sending the response according to access control list (ACL) logging rules.

16. The method of claim 10, wherein sending at least one of a copy of the encapsulated multicast packet or the inner packet towards a destination indicated in the encapsulated multicast packet along the multicast tree comprises forwarding the encapsulated multicast packet in a hardware data plane of a virtual extensible local area network (VXLAN).

17. An apparatus comprising:
a network interface unit to enable communication over a network; and
a processor coupled to the network interface unit to:
encapsulate an inner packet, configured with a multicast destination address and configured to perform a traceroute operation through a network, to form an encapsulated packet;
send the encapsulated packet into the network from the apparatus operating as a source device to a plurality of multicast destination devices, the encapsulated packet being forwarded along a multicast tree of the network for the multicast destination address; and
receive a separate response message from each of a plurality of network nodes comprising the multicast tree between the source device and each of the plurality of destination devices, wherein each response message is sent to the source device from respective network nodes of the plurality of network nodes in response to receipt of the encapsulated packet at the respective network nodes as the encapsulated packet traverses the multicast tree in a direction from the source device to the plurality of multicast destination devices, and each response message comprises an indication of a network node of the plurality of network nodes that sends the response message and an indication of a network node from which the network node sending the response message received the encapsulated packet.

18. The apparatus of claim 17, wherein the processor is configured to:
encapsulate the inner packet by encapsulating the inner packet in virtual extensible local area network (VXLAN) encapsulation; and
send the encapsulated packet into the network by sending the encapsulated packet into a VXLAN network.

19. The apparatus of claim 17, wherein the processor is further configured to determine an end-to-end path traversed by the encapsulated packet from the response messages received from the plurality of network nodes comprising the multicast tree.

20. The apparatus of claim 17, wherein the processor is configured to:
modify header information of the inner packet to form a modified inner packet;
encapsulate the modified inner packet to form a modified encapsulated packet;
send the modified encapsulated packet into the network, wherein the modified encapsulated packet is forwarded along a second multicast tree of the network for the multicast destination address in response to the modifying; and
receive response messages from a plurality of network nodes comprising the second multicast tree.

21. The apparatus of claim 20, wherein the processor is configured to send the modified encapsulated packet into the network by sending the modified encapsulated packet into the network from a different port than a port from which the encapsulated packet was sent into the network.

* * * * *